Figure 1:
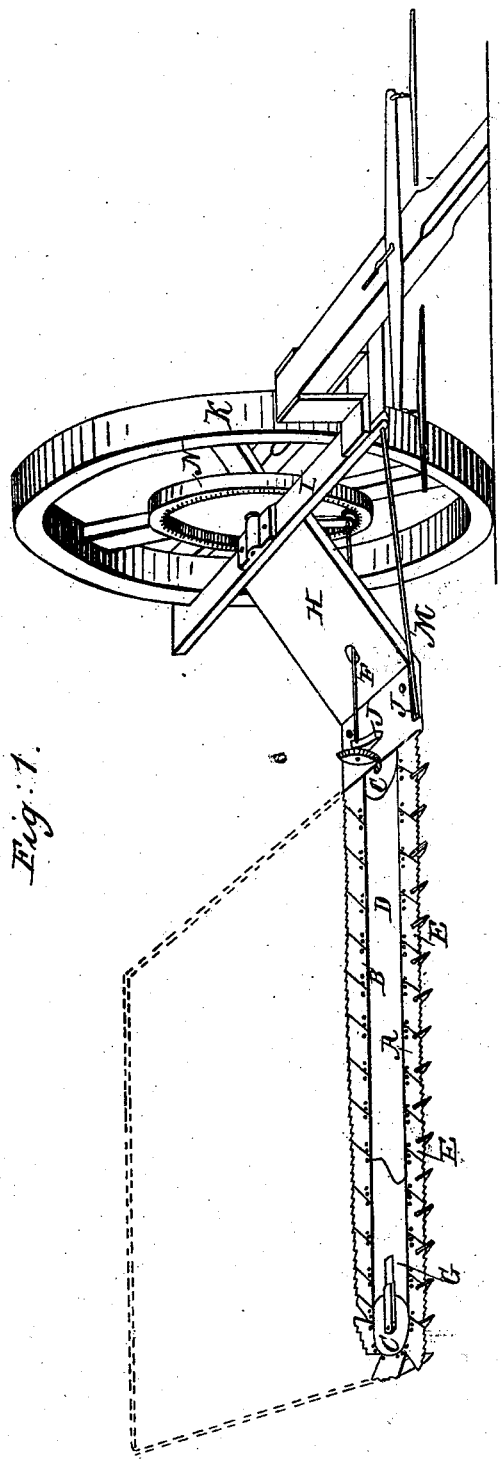

W. F. KETCHUM.
Machine for Reaping and Mowing.

No. 5,189. Patented July 10, 1847.

UNITED STATES PATENT OFFICE.

WILLIAM F. KETCHUM, OF BUFFALO, NEW YORK.

IMPROVEMENT IN REAPING-MACHINES.

Specification forming part of Letters Patent No. 5,189, dated July 10, 1847.

*To all whom it may concern:*

Be it known that I, WILLIAM F. KETCHUM, of the city of Buffalo, county of Erie, and State of New York, have invented a new and improved kind of cutter for cutting grain and grass called an "endless-chain cutter," and also an improved method of attaching the rack-piece to the frame, of which the following is a specification.

The nature of my invention consists in an endless-chain cutter for cutting grain and grass, and the application of it in such a way as will cause it to run around pulleys with the back of the cutter against them, (the pulleys are fixed on the rack-piece of proper length for the width of the swath to be cut,) with the cutter passing round the pulleys, the cutter being covered all but the edge which comes in contact with the grain or grass.

To enable others skilled in the art to make and use my invention, I will proceed to describe its construction and operation.

I make the endless belt of cutters, as seen at A, of iron and steel segments or pieces about three or four inches long, and I connect them together by lapping the longest pieces on the top of the short pieces, (seen at B.) The ends of the longest pieces meet in the center of the short pieces, and the short pieces are riveted fast with two rivets at one end, and the other end is riveted to the other long piece with one rivet, which is the joint or pivot on which the pieces work or turn. The inner corner of the longest pieces are rounded off, so that the belt may bend or work around the pulleys, (seen at *c c*.) The belt of cutters is placed on the rack-piece D flatwise and around the pulleys edgewise, or, rather, the back part of the cutter is against the pulleys and the cutting-edge projecting from them between the rack-teeth. The rack-teeth are fastened to the rack under the belt of cutters, and are seen at E E, projecting out in front of the cutting-edge. The inner corners of the longest pieces or segments of the belt of cutters being rounded allows the belt to yield and work around the pulleys edgewise. The pulley nearest the driving-wheel is propelled by cogs on the shaft F, which shaft is propelled by the main cog-wheel, (seen at N.) The other pulley yields to the uneven surface of the belt by a spring, G, bearing against its boxing.

The crooked arm or coupling-piece H, which connects the rack-piece D to the cast-iron frame L, I make of cast-iron and fasten one end of it to the frame at or near the center of the driving-wheel K. The other end has a sort of open mortise in it, in which I fasten the rack-piece D with bolts, (seen at J J,) which rack-piece may be made of wood or wrought-iron. By connecting the rack-piece to the crooked coupling-piece H and the crooked coupling-piece I, I am not confined to a small driving-wheel, but can use any diameter required. With this improvement of the crooked coupling, my rack and cutters are always on a level with the ground, and as near the ground as it may be required for cutting grain and grass. Although the frame and the center of the driving-wheel where the coupling is attached may be two feet or more from the ground, I attach this coupling anywhere on the frame within the diameter of the driving-wheel, which enables me to rake the grain off the platform L on one side out of the track of the machine. I brace the rack to the frame with a wrought-iron brace from the front part of the frame, (seen at M.)

What I claim as my invention, and desire to secure by Letters Patent, is—

1. The endless-chain cutter, in combination with the pulleys and rack-teeth for cutting grain and grass, as above described.

2. The crooked arm or coupling-piece, in connection and combination with the rack-piece and frame, as above set forth, for the purposes therein stated.

WILLIAM F. KETCHUM.

Witnesses:
SELAH BARNARD,
S. C. COE.